(12) United States Patent
Gastner et al.

(10) Patent No.: US 7,867,948 B2
(45) Date of Patent: Jan. 11, 2011

(54) USE OF GUANIDINE COMPOUNDS AS PHYSIOLOGICAL STRENGTHENING AGENTS IN THE FORM OF NUTRITIONAL SUPPLEMENTS, ANIMAL FEED ADDITIVES, IN COSMETIC PREPARATIONS AND AS PLANT STIMULANTS

(75) Inventors: Thomas Gastner, Trostberg (DE); Hans-Peter Krimmer, Kirchweidach (DE); Thomas Güthner, Trostberg (DE); Werner Sturm, Tacherting (DE)

(73) Assignee: Alzchem Trostberg GmbH, Trostberg (DE)

( * ) Notice: Subject to any disclaimer, the term of this patent is extended or adjusted under 35 U.S.C. 154(b) by 1454 days.

(21) Appl. No.: 10/990,346

(22) Filed: Nov. 16, 2004

(65) Prior Publication Data

US 2005/0192183 A1   Sep. 1, 2005
US 2007/0037710 A9   Feb. 15, 2007

(30) Foreign Application Priority Data

Mar. 1, 2004   (DE) ................. 10 2004 009 962

(51) Int. Cl.
    A01N 25/00   (2006.01)
    A01N 35/10   (2006.01)

(52) U.S. Cl. .................... 504/116.1; 504/343
(58) Field of Classification Search .............. 504/116.1, 504/343
    See application file for complete search history.

(56) References Cited

U.S. PATENT DOCUMENTS

| | | | | |
|---|---|---|---|---|
| 5,702,719 | A * | 12/1997 | Donzis | 424/442 |
| 6,602,512 | B1 * | 8/2003 | Cavazza | 424/400 |
| 6,849,576 | B2 * | 2/2005 | Suzuki et al. | 504/116.1 |
| 6,903,136 | B2 * | 6/2005 | Miller et al. | 514/556 |
| 2006/0083793 | A1 * | 4/2006 | Gardiner et al. | 424/641 |

FOREIGN PATENT DOCUMENTS

| | | | |
|---|---|---|---|
| FR | 2 248 032 | * | 2/1975 |
| FR | 2 162 262 | * | 3/1975 |
| GB | 1 468 998 | * | 6/1974 |
| WO | WO 01/06873 A1 | | 2/2001 |

OTHER PUBLICATIONS

Berge et al., Pharmaceutical Salts, Journal of Pharmaceutical Sciences, 66:1, pp. 1-19, 1977.*
Creatinol phosphate, http://www.chemblink.com/products/6903-79-3.htm, 2 pages.*
Creatinol-o-phosphate, http://www.lookchem.com/cas-690/6903-79-3.html, 3 pages.*

* cited by examiner

Primary Examiner—Johann R Richter
Assistant Examiner—Kristie L Brooks
(74) Attorney, Agent, or Firm—Fulbright & Jaworski L.L.P.

(57) ABSTRACT

Physiological strengthening agents in the form of nutritional supplements, feed additives or in cosmetic preparations in the non-medicinal field of application, as well as plant stimulating agents is the use of guanidine compounds of the general formula (I)

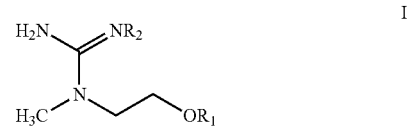

or their salts, especially creatinol, creatinol-O-phosphate or one of their salts with aspartic acid, ascorbic acid, succinic acid, fumaric acid, acetic acid or phosphoric acid. $R^1$ and $R^2$ can be organic or inorganic compounds, such as, phosphate, sulfate, acetyl, formyl, methyl, ethyl or propyl. The compounds are as nutritional supplements for, e.g., human being in the fields of education, sports, reconvalescence or geriatrics They can also be used as animal feed additives.

15 Claims, No Drawings

USE OF GUANIDINE COMPOUNDS AS PHYSIOLOGICAL STRENGTHENING AGENTS IN THE FORM OF NUTRITIONAL SUPPLEMENTS, ANIMAL FEED ADDITIVES, IN COSMETIC PREPARATIONS AND AS PLANT STIMULANTS

This application claims priority from German 10 2004 009 962.6 filed Mar. 1, 2004, herein incorporated by reference in its entirety.

BACKGROUND AND SUMMARY OF THE INVENTION

The subject of the present invention is the use of defined guanidine compounds as physiological strengthening agents.

Guanidine compounds and especially endogenous guanidine compounds have long been known as appropriate nutritional supplements, feed additives, or as components of cosmetic preparations. Particularly creatine can be mentioned as a representative compound, being an endogenous amino acid derivative which, especially as a phosphocreatine rich in energy, in addition to adenosine triphosphate (ATP), is an important energy reserve of muscle. For creatine can absorb phosphate in an energy-rich bond, and thus is in direct equilibrium with ATP.

Creatine is produced primarily by the liver and kidneys under physiological conditions and is stored in small amounts in muscle tissue where it serves as phosphocreatine in the action state by the above-mentioned phosphate group transfer to ADP for the regeneration of ATP. However, when muscles work hard and over a fairly long time, the creatine supplies naturally present in the body are rapidly exhausted. For this reason, targeted doses of creatine, especially in competitive sport participants, have had a positive effect on their endurance and performance, while undesirable accumulation processes in the body or harmful degradation products are unknown. The reason for this is to be seen in the fact that in the case of any overshooting administration, the creatine is excreted always in the form of physiological creatinine.

In addition to creatine itself, however, i.e., the creatine monohydrate, numerous creatine salts, such as creatine ascorbate, citrate, pyruvate and others, have also proven to be suitable nutritional supplements. Representatives that can be mentioned here are European patent EP 894 083 and German Offenlegungsschrift DE 197 07 694 A1.

The effects which have been produced by creatine in human beings and have proven beneficial are also, however, produced in animals, so that for years its use in various animal feeds have also been prescribed. In International Patent Application WO 00/67 690 the use of creatine or creatine salts as feed additive for breeding animals and fattening animals, as a replacement for animal meal, fish meal and/or antimicrobial performance enhancers, growth hormones, as well as anabolics. GB 2 300 103 teaches the use of creatine in the form of a dog biscuit, for which purpose creatine monohydrate is offered together with meat in an extruded composition. But since creatine monohydrate is only insufficiently bioavailable due to its poor solubility, its use in common with other physiologically active compounds is recommended, preferably in a salt form. The subject of German Offenlegungsschrift DE 198 36 450 A1 is the use of stable pyruvic acid salts and especially creatine pyruvate in formulations which are appropriate for animal nutrition.

In addition to their function as energy reserves and their consequent use as nutritional supplements and animal feed additives, guanidine derivatives, and here again, especially creatine, are suitable also for cosmetic applications. Thus German Offenlegungsschrift DE 198 41 386 describes creatine as a cosmetic moisturizer, the creatine, mainly in the form of cremes, feeding moisture to the upper skin layers in topical applications, with the result of improving tissue turgor and the smoothing of wrinkles.

DE 100 03 835 A1 deals with formulations in dehydration conditions, such as generally occur in older persons and especially those with limited mobility. In this case too, creatine acts as a transport medium for water so as to provide moisture to tissues most severely affected by dehydration symptoms.

In addition to its known properties as a physiological strengthening agent, mainly in infants, in the form of nutritional supplements, animal feed additives or also in cosmetic preparations, creatine is also proposed as a plant growth stimulant (still unpublished).

In addition to its undisputed positive physiological properties, creatine has the disadvantage, however, that it is poorly soluble as creatine monohydrate and has no particular storage ability in the corresponding aqueous solutions, changing to creatinine after a relatively long time.

In the state of the art, in addition to creatine and its derivatives as prominent guanidine compounds, creatinol, which is used mainly in the form of creatinol-O-phosphate as a medicament for strengthening cardiac functions.

Creatinol-O-phosphate is catabolized in the cell to creatinol, while creatinol-O-phosphate, like creatine, is evidently also converted to creatinine. Thus, G. F. Melloni et al. state that the creatinine levels increase in the urine after the administration of creatinol-O-phosphate (in: Arzneimittelforschung 1979, 29 (9A) 1477-79). It is therefore to be assumed that creatinol is first reacted in the cell to creatine in order then to be excreted in the normal way, i.e., also as creatinine.

Creatinol and its salts have previously been described to only a limited extent, GB 1 468 998 and FR 2 162 262 being here named, for example. The British patent describes creatinol derivatives as well as a manufacturing process appropriate for that purpose, and its use in pharmaceutical formulations, which can be administered orally, parenterally or rectally. In experiments performed accordingly on rats a swimming activity increased by 30% could be detected with creatinol aspartate. Usually, creatinol and its appropriate derivatives are mainly used for treating muscular diseases, such as myasthenias, i.e., autoimmune neuromuscular diseases of the skeletal muscles and the heart muscle. The said French patent describes creatinol sulfate and a method of manufacturing it, the compound itself again being used in the treatment of cardiopathies and myasthenias.

In the Chinese patent CN 1 078 364, creatinol is used in conjunction with a principal agent made from morin root in the form of tea for the treatment of senility phenomena, to promote spermatogenesis and to increase kidney tone.

Based on the disadvantages of the state of the art as regards creatine, the problem is created for the present invention of providing guanidine compounds for a new use as physiological strengthening agents. The guanidine compounds to be used are to have but low instability insofar as possible, especially in aqueous solution, and are to be transformed to the corresponding degradation products only after application or physiological absorption. The degradation products formed by catabolic processes are to be kidney-accessible, have no physiologically undesirable effects and be easily detectable. From the economic standpoint it was also important for the guanidine derivatives being used according to the invention to be able to be manufactured in an economically desirable manner.

This problem was solved by the use of guanidine compounds of General Formula (I):

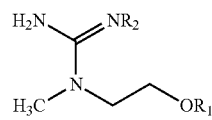

as physiological strengthening agents in the form of nutritional supplements, animal feed additives, or in cosmetic preparations in the non-medicinal field of application, as well as plant stimulants.

It was found surprisingly in their use according to the invention that the claimed compounds actually do satisfy the profile of the requirements that were made, since they can be manufactured in a simple and economical manner; in contrast to creatine and creatine monohydrate, they have a pronounced stability in aqueous solution, and evidently they actually follow the creatine course under physiological conditions. Thus, the guanidine compounds used in connection with the claimed use, and especially the creatinol derivatives, are first converted to creatine in the cell and then are excreted as creatinine. Surprisingly it has proven especially advantageous that the guanidine derivatives described in the present connection, in contrast to creatine, are thus actually transformed under physiological conditions to the particular degradation products, so that the predominant part of the compounds used is not lost by instability reactions in the preliminaries to the known creatine, but are actually available to the physiological areas of application. The guanidine compounds according to the invention can thus be re-used, unlike creatine and its derivatives, to the identical effect, with definitely lower dosages. The advantages of the use claimed by the invention were thus not foreseeable in their entirety.

DETAILED DESCRIPTION

As it can be seen from general formula (I); the present invention provides the use of guanidine compounds in which either creatinol or creatinol ester compounds are involved, or their salts. The compounds are expressed by the definitions of the moieties $R^1$ and $R^2$ and their alternatives.

Of the great number of guanidine compounds of the general formula (I) involved for the purpose according to the invention, salts have proven especially desirable, which are obtained with aspartic acid, ascorbic acid, succinic acid, fumaric acid, oxalic acid, pyroglutamic acid, 3-nicotinic acid, lactic acid, citric acid, maleic acid, sulfuric acid, hydrochloric acid, hydrobromic acid, hydroiodic acid, acetic acid, formic acid and phosphoric acid.

Especially preferred are variant compounds in which the radicals $R^1$ and $R^2$ are those of the series phosphate, sulfate, acetyl, formyl, fumaryl, citryl, malyl, aspartyl, lactyl, methyl, ethyl or propyl.

For reasons of economy it has proven especially appropriate if creatinol, creatinol-O-phosphate, one of their salts or any mixtures are used for the claimed uses.

It has proven to be an additional advantage of the use according to the invention that the l s particular compounds can be used in relatively wide ranges of dosage. Both the single doses and the daily doses are not subject to any greater limitations, and also with a view to the likewise claimed use as plant stimulants, the guanidine compounds of formula (I) are applied both in relatively strong concentrations and in small amounts.

With regard to use as nutritional supplements, animal feed additives, but also in cosmetic preparations, single doses of 0.001 to 1 g/kg of body weight are involved, the present invention also providing also daily doses between 0.001 and 5 g.

It is to be considered essential to the invention that the claimed use is made in non-medicinal applications, and therefore forms of the application of nutritional supplements or animal feed additives have been proven especially suitable, which are in the form of pellets, solutions, juices and/or gelled products. Depending on the particular concrete application, it may be entirely recommendable to use the guanidine compounds of formula (I) as nutritional supplements or animal feed additives in combination with other physiologically active agents, carbohydrates, fats, amino acids, proteins, vitamins, minerals, trace elements and their derivatives and any desired mixtures thereof being especially suitable.

Especially with regard to use as nutritional supplements for human beings, the present invention recommends use in educations, sports, convalescence or in the geriatrical applications.

If the described guanidine compounds are used as animal feed additives, breeding animals and fattening animals as well as animals involved in performance sports are to be considered as preferred, and in this connection especially preferred are pigs, horses, poultry and fish, and use as substitutes for animal and/or fish meal as well as products prepared therefrom has also proven to be especially appropriate. Their substitution can be partial or complete.

Like the known applications for creatine, the guanidine compounds of formula (I) in the scope of the present invention can also be involved in cosmetic or determatological preparations in the non-medicinal field. In this case, preparations are preferred which are used in the form of cremes, lotions, sprays, mousse, aqueous-ethanolic solutions, imbibing media for cloths, water-free or water-containing pencils or microemulsions. Topical applications are considered as quite especially preferred.

In addition to the three named applications in the non-medicinal field, the present invention also covers the use of the guanidine compounds in the vegetal field, their use as physiological plant stimulating agents is becoming important. In this connection they can be used as granules, pellets, plant strengthening agents or mainly aqueous sprays. Their application is not limited to their being spread on the ground, but they can also be applied to plant parts above the ground.

In general, according to the present invention guanidine compounds and especially creatinol and its salts and derivatives are used in animal and vegetal applications, and in contrast to the well-known creatine compounds they have clear and surprising advantage. The following examples will show the breadth of the present invention.

EXAMPLES

1. Nutritional Supplements

The following are typical compositions of good-tasting formulations whose components were simply mixed dry at room temperature. It is recommended that the formulations in powder form be dissolved in 200 ml of fruit juice and/or water before oral administration.

| | |
|---|---|
| 1,500 mg | glucosamine |
| 750 mg | creatinol-O-phosphate |

-continued

| | |
|---|---|
| 720 mg | magnesium-L-hydrogen aspartate |
| 2,000 mg | glucose |
| 500 mg | ascorbic acid |
| 400 mg | chondroitin sulfate |
| 500 mg | creatinol sulfate |
| 2,000 mg | dicalcium phosphate |
| 400 mg | $(MgCO_3)_4 \cdot Mg(OH)_2 \cdot 5H_2O$ = approximately 100 Mg |
| 500 mg | vitamin C |
| 1,000 mg | glucosamine |
| 300 mg | chondroitin sulfate |
| 2,800 mg | creatine pyruvate |
| 3,100 mg | creatinol-O-phosphate |

2. Animal Feed Additive 2.1 A formulation consisting of 5,000 mg creatinol-O-phosphate and 5,000 mg inulin was added to a typical formula for feed pellets as a food supplement for horses.

2.2 A formulation consisting of 7,000 mg creatinol sulfate, 750 mg carnitine tartrate, 100 mg sucrose stearate, 160 mg talc, and 1,090 mg fructose was added to the base mixture for making dog biscuits.

2.3 As a master batch, the following formulation was added to a regular commercial canned cat food mixture: 3,000 mg creatinol sulfate, 3,000 mg creatine, 40 mg magnesium stearate, 25 mg carboxymethylcellulose and 135 mg lactose.

2.4 Feed for chickens raised for market

It was found that, by the addition of 0.2 wt.-% of creatinol-O-phosphate (0.2 g/kg) to the air-dried food, after 41 days feeding time an increase was achieved in the final weight of 4% more than in former feeding methods without addition of creatinol. This weight increase was accomplished not by increase of fat content or the addition of water (improvement of the head body mass index), and the meat also was of improved quality. In addition the feed consumption was about 2 to 3% less than in former feeding methods.

3. Plant Growth Stimulants 3.1 10 g creatinol-O-phosphate, 10 g dicyandiamide, 5 g cyanamide, 100 g ammonium hydrate, 125 g urea, 0.2 g iminodiacetic acid and 0.3 g sodium carboxymethyl cellulose were dissolved in 750 g water. A clear solution of pH 6.9 was obtained. This formulation served as liquid fertilizer with a plant stimulating action.

3.2 50 g creatinol-O-phosphate, 50 g dicyandiamide, 300 g urea, 200 g diammonium phosphate, 100 g potassium acetate, 100 g sodium acetate, 100 g potassium nitrate, 100 g ammonium sulfate, 1 g magnesiumsulfate monohydrate, 0.1 g sodium tetraborate, 0.1 g manganese sulfate monohydrate, 0.1 g iron(II) sulfate heptahydrate, 0.05 g ammonium heptamolybdate tetrahydrate, 0.1 g zinc sulfate heptahydrate and 0.05 g copper sulfate pentahydrate were mixed together dry. A 10 wt.-% aqueous suspension of this formulation showed a pH of 8.2. This solid formulation served as soluble fertilizer for watering purposes.

3.3 One liter of a liquid mixture of 15.7 g creatinol-O-phosphate, 6.1 g creatinine, 6.8 g dicyandiamide, 4/6 g cyanamide, 9.4 g N-methyl glycine, 1.4 g N-methyliminodiacetic acid, 27 g ammonium and 63 g sodium acetate had a pH of 8.8. To this liter, 100 g urea and 20 g 85% phosphoric acid were added, so that the pH of the water-clear formulation was 6.8. This formulation served as liquid fertilizer with a plant-stimulating additional effect.

It is claimed:

1. A method of physiologically strengthening or stimulating a plant comprising administering a sufficient amount of a guanidine compound or salt thereof of formula (I)

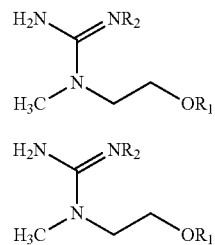

or salts thereof to a plant,
wherein
$R^1$=H and
$R^2$=H or an organic or inorganic moiety,
to physiologically strengthen the plant, wherein the compound is administered to the plant in an amount sufficient to strengthen or stimulate the plant.

2. The method according to claim 1, wherein the compound is creatinol sulfate.

3. The method according to claim 1, wherein the salt is a sulfate salt.

4. The method according to claim 1, wherein the compound is creatinol phosphate.

5. The method according to claim 1, wherein the salt is a phosphate salt.

6. The method according to claim 1, wherein $R^2$ is H.

7. The method according to claim 1, wherein $R^2$ is an organic moiety.

8. The method according to claim 1, wherein $R^2$ is an inorganic moiety.

9. The method of claim 1, wherein the compound is administered in the form of a spray, aqueous or aqueous-ethanolic solution, or water-free or water-containing microemulsion.

10. The method of claim 1, wherein the compound is administered to a plant as plant stimulating agent in the form of a granule, powder or spray solution.

11. The method of claim 10, wherein the application is administered together with fertilizers or soil improving agents.

12. The method of claim 1, wherein the compound is administered to a root of the plant.

13. The method of claim 1, wherein the compound is administered to a part of the plant that is above the ground.

14. The method of claim 13, wherein the part of the plant is the leaf.

15. The method according to claim 14, wherein the compound is creatinol phosphate.

* * * * *